United States Patent
Yang et al.

(10) Patent No.: US 9,832,446 B2
(45) Date of Patent: Nov. 28, 2017

(54) METHOD, DEVICE AND SYSTEM FOR PACKING COLOR FRAME AND ORIGINAL DEPTH FRAME

(71) Applicant: NATIONAL CHENG KUNG UNIVERSITY, Tainan (TW)

(72) Inventors: Jar-Ferr Yang, Tainan (TW);
Hung-Ming Wang, Tainan (TW);
Hsi-Chun Tseng, Zhongli (TW);
Ke-Ying Liao, Taipei (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 526 days.

(21) Appl. No.: 14/505,117

(22) Filed: Oct. 2, 2014

(65) Prior Publication Data
US 2015/0092029 A1   Apr. 2, 2015

(30) Foreign Application Priority Data

Oct. 2, 2013   (TW) .............................. 102135714 A

(51) Int. Cl.
H04N 13/04   (2006.01)
H04N 13/00   (2006.01)

(52) U.S. Cl.
CPC ..... *H04N 13/0029* (2013.01); *H04N 13/0048* (2013.01); *H04N 13/0059* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,110,459 B2* | 9/2006 | Srinivasan | ........... | H04N 19/523 375/240 |
| 7,116,831 B2* | 10/2006 | Mukerjee | ............. | H04N 19/117 375/240.13 |
| 7,587,120 B2* | 9/2009 | Koo | .................... | H04N 13/0495 385/146 |
| 8,374,456 B2* | 2/2013 | Vetro | ........................ | G06T 3/40 382/154 |
| 8,537,206 B2* | 9/2013 | Son | ..................... | G02B 27/2264 348/53 |
| 8,643,701 B2* | 2/2014 | Nguyen | ............... | H04N 13/025 348/47 |

(Continued)

FOREIGN PATENT DOCUMENTS

| | | |
|---|---|---|
| CN | 101904176 A | 12/2010 |
| EP | 2685727 A2 | 1/2014 |

(Continued)

*Primary Examiner* — Anand Bhatnagar
(74) *Attorney, Agent, or Firm* — Muncy, Geissler, Olds & Lowe, P.C.

(57) ABSTRACT

A method, device and system for packing a color frame and an original depth frame to obtain a packed frame are disclosed. The color frame is corresponding to the original depth frame, and the packed frame is to be displayed on a screen. The method for packing the color frame and the original depth frame includes the steps of: resizing the original depth frame to obtain a resized depth frame; and combining the color frame and the resized depth frame to obtain the packed frame. The center of the color frame is displayed in the central area of the screen.

39 Claims, 17 Drawing Sheets

(56) References Cited

U.S. PATENT DOCUMENTS

| | | | | |
|---|---|---|---|---|
| 8,659,592 B2* | 2/2014 | Wang | H04N 13/026 | |
| | | | 345/419 | |
| 8,760,495 B2* | 6/2014 | Jeon | H04N 13/0022 | |
| | | | 348/153 | |
| 8,872,892 B2* | 10/2014 | Yamaji | H04N 13/0011 | |
| | | | 348/42 | |
| 8,982,117 B2* | 3/2015 | Park | H04N 13/0404 | |
| | | | 345/419 | |
| 9,100,640 B2* | 8/2015 | Boross | H04N 13/0018 | |
| 9,256,974 B1* | 2/2016 | Hines | G06F 3/0346 | |
| 9,438,879 B2* | 9/2016 | Newton | H04N 13/0018 | |
| 9,495,791 B2* | 11/2016 | Maleki | H04N 13/0029 | |
| 2003/0202607 A1* | 10/2003 | Srinivasan | H04N 19/61 | |
| | | | 375/240.29 | |
| 2007/0024614 A1* | 2/2007 | Tam | G06T 7/13 | |
| | | | 345/419 | |
| 2010/0045780 A1* | 2/2010 | Kwon | H04N 13/0048 | |
| | | | 348/51 | |
| 2010/0201790 A1* | 8/2010 | Son | G02B 27/2264 | |
| | | | 348/53 | |
| 2010/0310155 A1* | 12/2010 | Newton | H04N 13/0055 | |
| | | | 382/154 | |
| 2011/0316881 A1* | 12/2011 | Yoshifuji | H04N 13/0409 | |
| | | | 345/634 | |
| 2012/0050483 A1* | 3/2012 | Boross | H04N 13/0018 | |
| | | | 348/46 | |
| 2012/0269458 A1* | 10/2012 | Graziosi | H04N 19/597 | |
| | | | 382/299 | |
| 2013/0050415 A1* | 2/2013 | Wang | H04N 13/0029 | |
| | | | 348/43 | |
| 2014/0204175 A1* | 7/2014 | Yang | H04N 13/0282 | |
| | | | 348/43 | |

FOREIGN PATENT DOCUMENTS

| | | |
|---|---|---|
| JP | 2008-141516 A | 6/2008 |
| JP | 2011-508498 A | 3/2011 |
| JP | 2013-519286 A | 5/2013 |
| KR | 10-2010-0102161 A | 9/2010 |
| TW | 201237773 | 9/2012 |
| TW | 201312498 A | 3/2013 |
| WO | WO2009/081335 A1 | 7/2009 |
| WO | WO2010/108024 A1 | 9/2010 |
| WO | WO2012/014171 A1 | 9/2010 |
| WO | WO2012121543 A2 | 9/2012 |

* cited by examiner

METHOD, DEVICE AND SYSTEM FOR PACKING COLOR FRAME AND ORIGINAL DEPTH FRAME

CROSS REFERENCE TO RELATED APPLICATIONS

This Non-provisional application claims priority under 35 U.S.C. §119(a) on Patent Application No(s). 102135714 filed in Taiwan, Republic of China on Oct. 2, 2013, the entire contents of which are hereby incorporated by reference.

BACKGROUND OF THE INVENTION

Field of Invention

The present invention relates to a method, device and system for packing a color frame and an original depth frame to obtain a packed frame.

Related Art

As the progress of technologies, the performance and quality of electronic products have become the prior consideration of electronic product development. For example, the basic requirement for display devices is to provide a high-definition and more comfortable images. Except for the basic requirement, the manufacturer further develops the 3D display device for providing multi-view angle 3D images as well as a new visual experience to the users.

In general, a 3D image generating system can analyze the original 2D image data (e.g. an original color frame) so as to produce an original depth frame corresponding to the original color frame, and then transmit the original color frame and the original depth frame to a 3D display device of the user through the conventional transmission apparatus. After receiving the original color frame and the original depth frame, the 3D display device can process the frames by depth-image-based rendering (DIBR) to produce two or more multi-view angle images for any naked-eye 3D display device or to produce a left-eye image and a right-eye image for a glasses-type 3D display device.

However, the general televisions for family use are majorly the 2D display devices, which are not equipped with the function of producing the multi-view angle images or the left-eye and right-eye images. As a result, after receiving the 3D image signals, the 2D display device will display the combined left-eye and right-eye images or the single-view angle and single depth images side by side. In fact, there are more and more available 3D images, so it will be very common to execute the 3D image signals by the 2D display devices. Unfortunately, the 2D display devices can only display 2D images (color frame), which are not smooth and will make the viewer very uncomfortable.

SUMMARY OF THE INVENTION

An objective of the present invention is to provide a method, a device and a system for packing a color frame and an original depth frame to obtain a packed frame, which can be directly displayed by a 2D display device, while the displayed 2D images are smoothly shown in the central area of a screen and will not make the viewer uncomfortable.

To achieve the above objective, the present invention discloses a method for packing a color frame and an original depth frame to obtain a packed frame. The color frame is corresponding to the original depth frame, and the packed frame is to be displayed on a screen. The method includes the following steps of: resizing the original depth frame to obtain a resized depth frame; and combining the color frame and the resized depth frame to obtain the packed frame. A center of the color frame is displayed in a central area of the screen.

To achieve the above objective, the present invention also discloses a device for packing a color frame and an original depth frame to obtain a packed frame, which includes a size processing unit and a combine processing unit. The color frame is corresponding to the original depth frame, and the packed frame is to be displayed on a screen. The size processing unit resizes the original depth frame to obtain a resized depth frame. The combine processing unit combines the color frame and the resized depth frame to obtain the packed frame. A center of the color frame is displayed in a central area of the screen.

To achieve the above objective, the present invention further discloses a system for packing a color frame and an original depth frame to obtain a packed frame, which includes a memory unit and a processing unit. The color frame is corresponding to the original depth frame, and the packed frame is to be displayed on a screen. The memory unit stores the color frame and the original depth frame. The processing unit resizes the original depth frame to obtain a resized depth frame, and combines the color frame and the resized depth frame to obtain the packed frame. A center of the color frame is displayed in a central area of the screen.

As mentioned above, in the method, device and system of the invention for packing a color frame and an original depth frame to obtain a packed frame, the color frame and resized depth frame are combined to obtain a packed frame with a center displayed at the central area of the screen. Afterward, the packed frame can be restored to obtain the original color frame or the original depth frame, which can be further processed by the 3D display device according to the depth image-based rendering (DIBR) so as to produce correct naked-eye multi-view angle 3D images or glasses type dual-view angle 3D images. Most important, since the center of the color frame is displayed at the central area of the screen, and the center point of the color frame and the center point of the screen are preferably overlapped and most preferably totally overlapped, the packed frame can be directly displayed on the screen of a 2D display device. Moreover, the displayed 2D images (color frames) are smoothly shown in the central of a screen and will not make the viewer uncomfortable.

In addition, the method, device and system of the invention also resize the original depth frame to obtain the resized depth frame and combine the color frame and the resized depth frame to obtain a simplified packed frame. Accordingly, the technology of the invention can be cooperated with other video compression system to enhance the compression ratio, thereby decreasing the bandwidth requirement for 3D video. This feature is further benefit to the promotion of 3D channels.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
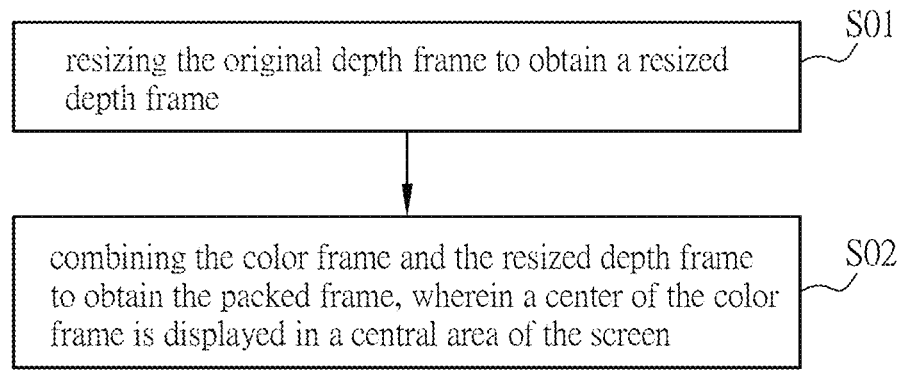
FIG. 1A is a flow chart of a method for packing a color frame and an original depth frame according to a preferred embodiment of the invention.
Figure 1B:
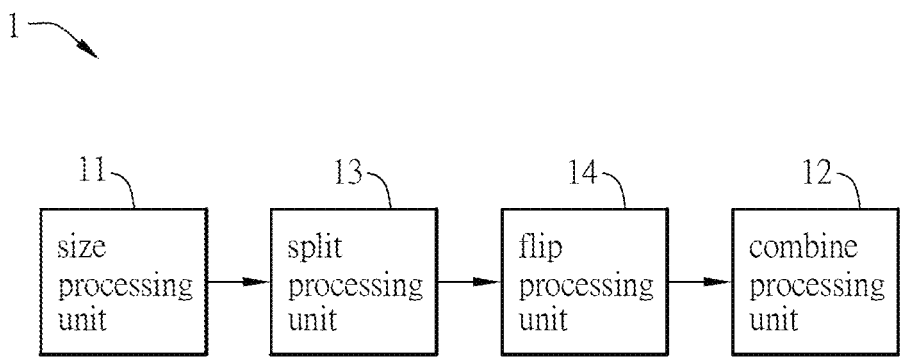
FIG. 1B is a functional block diagram of a device for packing a color frame and an original depth frame according to a preferred embodiment of the invention.

FIG. 1A is a flow chart of a method for packing a color frame and an original depth frame according to a preferred embodiment of the invention, and FIG. 1B is a functional block diagram of a device 1 for packing a color frame and an original depth frame according to a preferred embodiment of the invention. The obtained packed frame according to the invention can be directly displayed in a screen, and especially a screen of a 2D display device. The resolution of 2D display device is, for example but not limited to, 1920×1080 pixels.

As shown in FIG. 1A, the method for packing a color frame and an original depth frame to obtain a packed frame includes steps S01 and S02. As shown in FIG. 1B, the device 1 includes a size processing unit 11 and a combine processing unit 12. Moreover, the device 1 further includes a split processing unit 13 and a flip processing unit 14. The method and device 1 for packing a color frame and an original depth frame to obtain a packed frame will be described hereinafter with reference to FIGS. 2A to 4B.

Figure 2A:
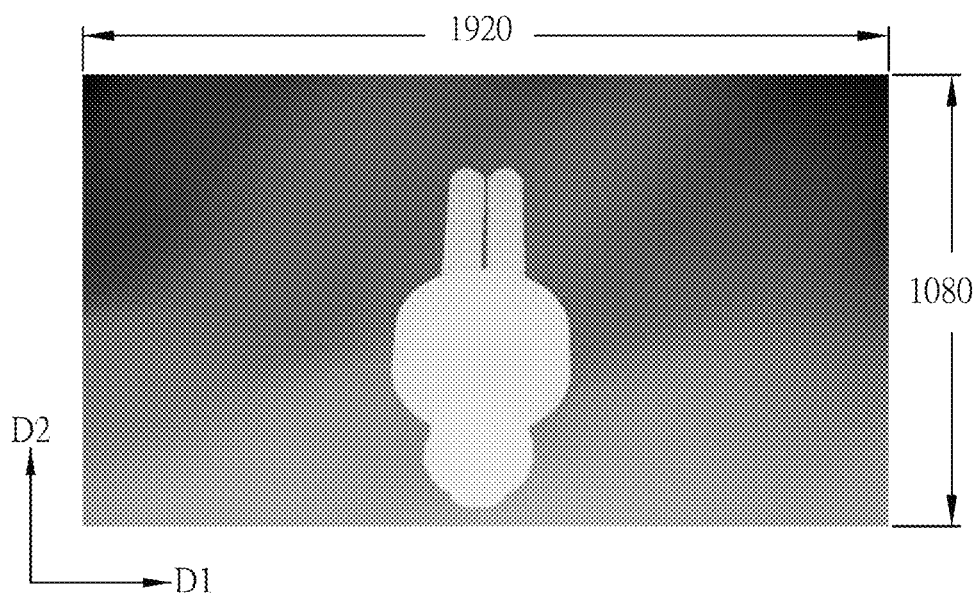
FIGS. 2A to 2D are schematic diagrams showing the procedure for processing an original depth frame of a first embodiment.
Figure 2B:
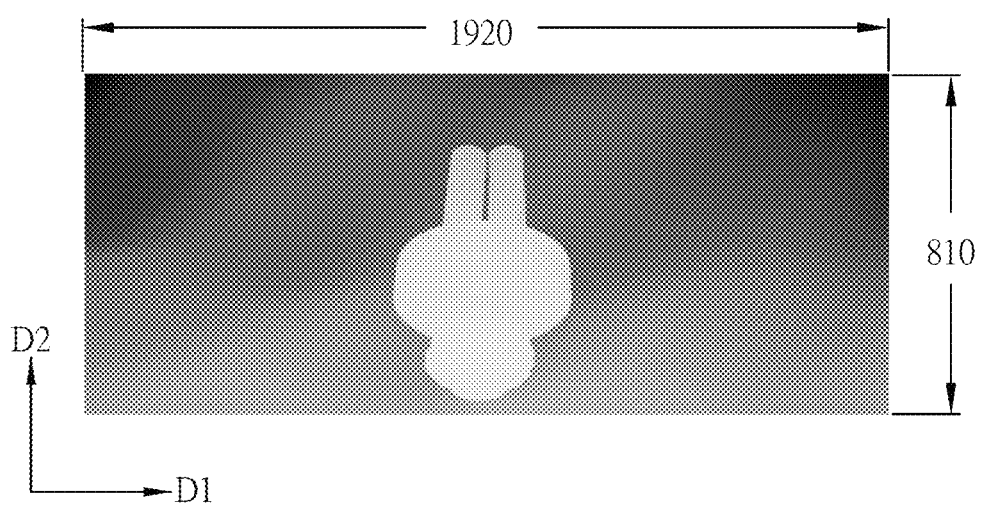
Figure 2C:
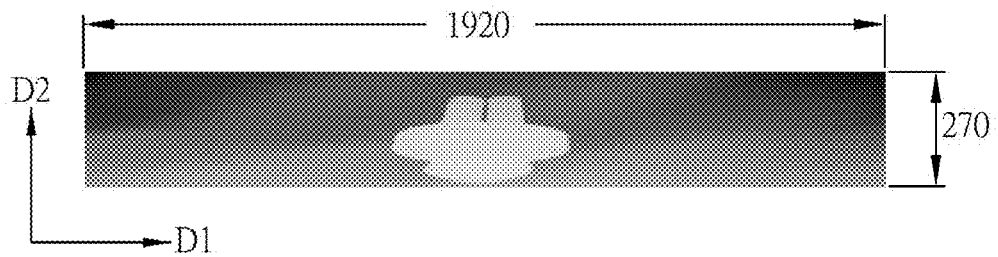
Figure 2D:
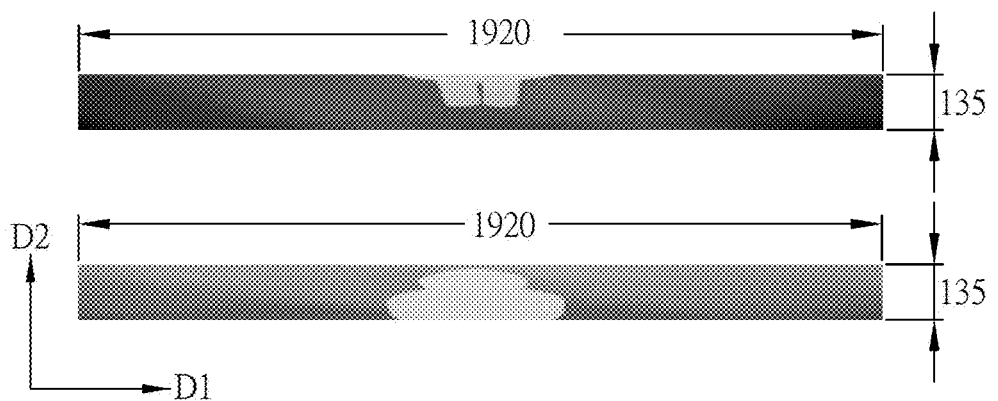
Figure 3A:
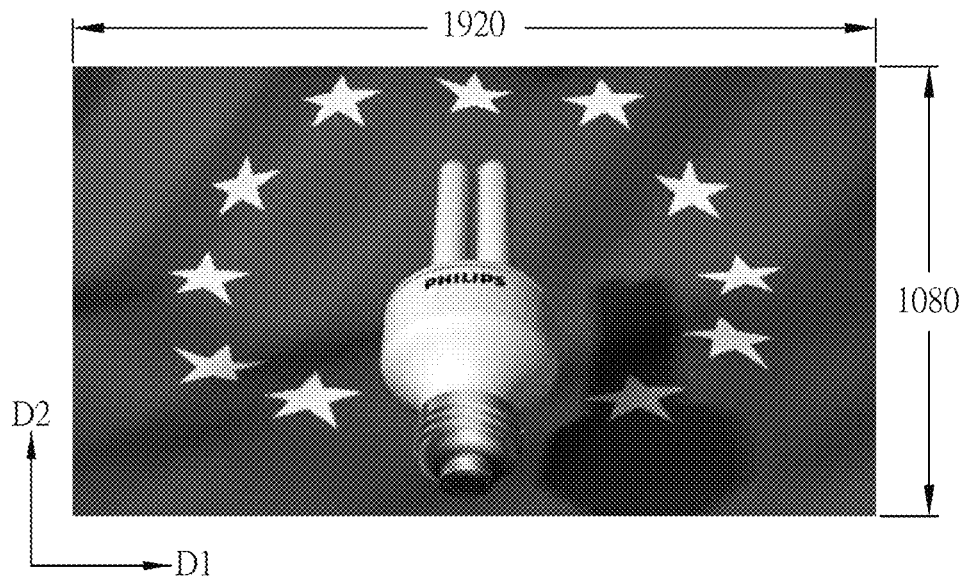
FIGS. 3A and 3B are schematic diagrams showing the procedure for processing an original color frame of the first embodiment.
Figure 3B:
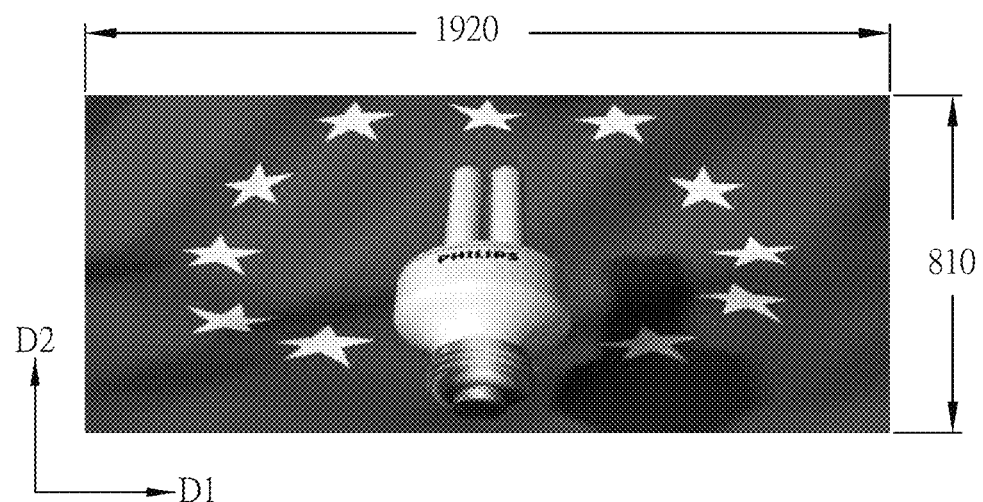

FIGS. 2A to 2D are schematic diagrams showing the procedure for processing an original depth frame of a first embodiment. FIG. 2A shows an original depth frame, FIG. 2B shows an intermediate depth frame, FIG. 2C shows a resized depth frame, and FIG. 2D shows two parts of the resized depth frame after being split and flipped. In addition, FIGS. 3A and 3B are schematic diagrams showing the procedure for processing an original color frame of the first embodiment. FIG. 3A shows an original color frame, and FIG. 3B shows a color frame produced by resizing the original color frame of FIG. 3A.

In this embodiment, the color frame is obtained by resizing the original color frame. The original color frame has a preset frame size such as, for example but not limited to, 1920×1080 pixels, which is the same as the resolution of the HD 2D display device. In this case, the sizes of the original depth frame and the original color frame are the same and equal to the preset frame size. Of course, in other aspects, the preset frame size may have different values. In addition, the figures show a row direction D1 and a column direction D2. The row direction D1 is a horizontal direction of the displayed frame image, and the column direction D2 is a vertical direction of the display frame image. To be noted, although the shown images in FIGS. 3A and 3B are black-and-white images, they in fact can be color images in a color display device.

The original depth frame is corresponding to the original color frame. That is, the original depth frame and the original color frame have the same size or resolution. Besides, the original depth frame is produced according to the depth values of all objects in the original color frame. The original depth frame and the original color frame can synthesize according to DIBR so as to produce a 3D image to be displayed by a 3D display device. Since the original depth frame is corresponding to the original color frame, the original depth frame is also corresponding to the color frame.

As shown in FIG. 1A, the step S01 of this method is to resize the original depth frame to obtain a resized depth frame (from FIG. 2A to FIG. 2B). Herein, the original depth frame of FIG. 2A is a gray-level frame, so all sub-pixels in one pixel have the same sub-pixel value (the same gray-level value). Each pixel may have 2 or more sub-pixels. In this embodiment, each pixel has 3 sub-pixels R, G, B for example.

In step S01, the original depth frame (FIG. 2A) is resized to obtain an intermediate depth frame (FIG. 2B), and then the sub-pixels of the intermediate depth frame is rearranged to obtain the resized depth frame (FIG. 2C). The step of resizing the original depth frame to obtain the intermediate depth frame is achieved by downscaling the size of the original depth frame or to reducing the resolution of the original depth frame. In this embodiment, the size processing unit 11 can downscale the original depth frame of FIG. 2A so as to obtain the intermediate depth frame of FIG. 2B.

Herein, the size of the intermediate depth frame along the column direction D2 is downscaled to ¾ of the size of the original depth frame. As a result, the size of the intermediate depth frame is 1920×810 (810=1080×¾).

Then, the sub-pixels are rearranged. The sub-pixel rearrangement is to retrieve two sub-pixel values from three pixels of the intermediate depth frame, and then to correspondingly store the sub-pixel values in three sub-pixels of one pixel of the resized depth frame. Herein, since the original depth frame is a gray-level frame, all three sub-pixel values of one pixel are the same, any sub-pixel value in one pixel can be a representative value.

The sub-pixel rearrangement is to retrieve the sub-pixel values of three pixels of the intermediate depth frame and then store the sub-pixel values into three sub-pixels of one pixel of the resized depth frame. In more detailed, the sub-pixel value of a first pixel of the intermediate depth frame is stored in a first sub-pixel of a first pixel of the resized depth frame, the sub-pixel value of a second pixel of the intermediate depth frame is stored in a second sub-pixel of the first pixel of the resized depth frame, and the sub-pixel value of a third pixel of the intermediate depth frame is stored in a third sub-pixel of the first pixel of the resized depth frame. This rule can be applied to other pixels and sub-pixels. Accordingly, the intermediate depth frame of FIG. 2B is downscaled to ⅓ of the original one along the column direction D2, and the resized depth frame of FIG. 2C has a resolution of 1920×270 (270=810×⅓).

Accordingly, the size of the resized depth frame of FIG. 2C is ¼(¾×⅓) of the original depth frame along the column direction D2. Since the sub-pixel rearrangement technology is used, the gray-level values of three columns of pixels in the intermediate depth frame can be stored in three sub-pixels of one pixel in the resized depth frame. Compared to the original depth frame, the resized depth frame has higher coding efficiency and less data amount, so that it is possible to improve the transmission efficiency during data transmission.

The sub-pixel rearrangement can make the frame be downscaled, so this technology is also called a sub-pixel packing rearrangement.

The step of resizing the original color frame to obtain the color frame is to downscale the size of the original color frame or to reduce the resolution of the original color frame. In this embodiment, the size processing unit 11 downscales the original color frame of FIG. 3A to obtain the color frame of FIG. 3B. Herein, the size of the color frame along the column direction D2 is downscaled to ¾ of the size of the original color frame. In other words, the size of the original color frame of FIG. 3A along the column direction D2 is downscaled by ¾ to obtain the color frame of FIG. 3B. As a result, the resolution of the color frame is 1920×810 (810=1080×¾). Of course, in other embodiments, the size of the original color frame can be downscaled by other proportions or it can be downscaled along the row direction D1 or along the row direction D1 and the column direction D2. This invention is not limited.

After the color frame and the resized depth frame are obtained, the step S02 is performed to combine the color frame and the resized depth frame to obtain a packed frame. Before the step S02 of combining the color frame and the resized depth frame by the combine processing unit 12, a split processing unit 13 splits the resized depth frame into two parts (splitting along the row direction D1), and a flip processing unit 14 flips the two parts so as to obtain two parts of FIG. 2D (the size of each part is 1920×135). Afterwards, the combine processing unit 12 combines the two flipped parts at a top side and a bottom side of the color frame, respectively, to obtain the packed frame of FIG. 4A. Herein, "flipping" is to turn over by 180 degrees and make the part upside down. The sizes of the two parts split from the resized depth frame are the same.

Figure 4A:
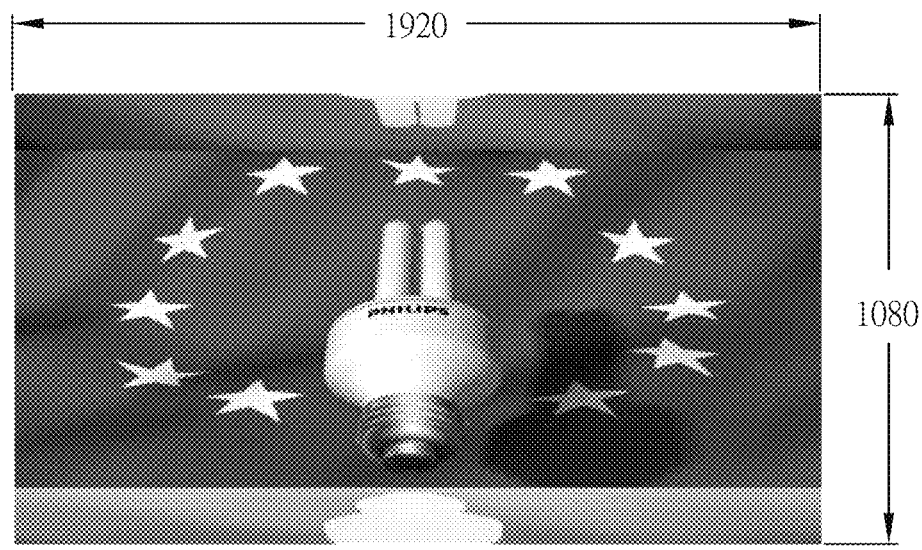
FIG. 4A is a schematic diagram showing a packed frame of the first embodiment.
Figure 4B:
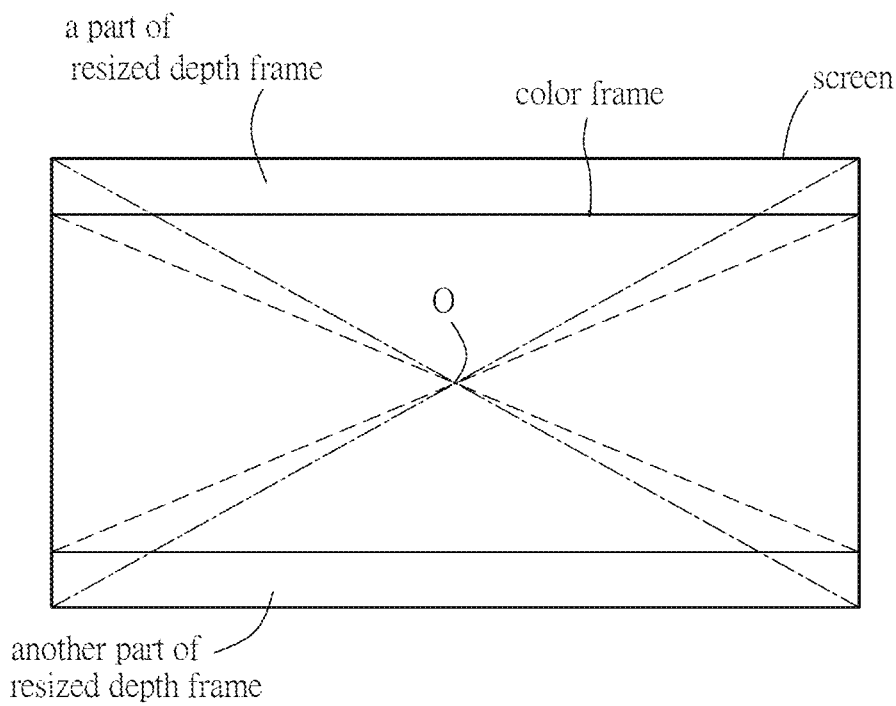
FIG. 4B is a schematic diagram showing the color frame and a screen as a 2D display device displays the packed frame of the first embodiment.

FIG. 4B is a schematic diagram showing the color frame and a screen as a 2D display device displays the packed frame of the first embodiment.

Figure 4C:
FIG. 4C is a schematic diagram showing an image of another packed frame obtained by the method and device for packing a color frame and an original depth frame.
Figure 4D:
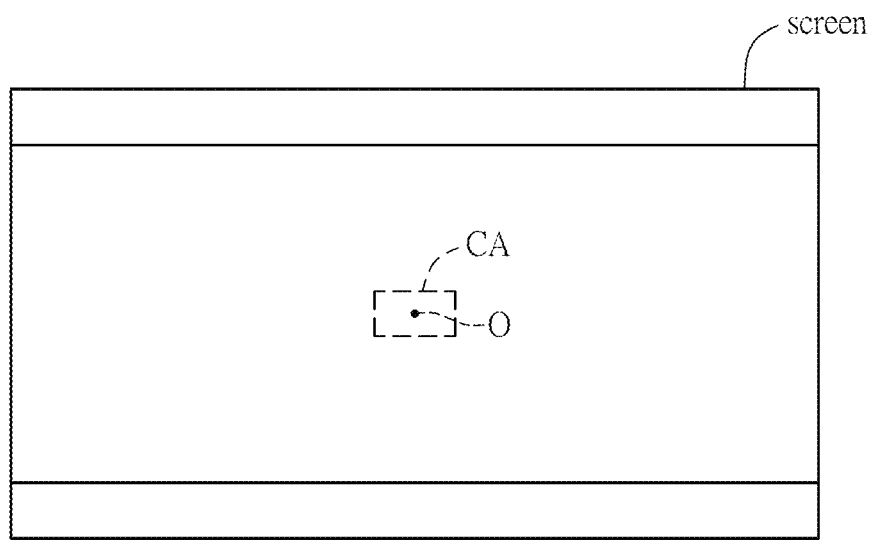
FIG. 4D is a schematic diagram showing the central area of the screen according to the embodiment of the invention.

The packed frame is restored to obtain the original color frame or the original depth frame, which can be further processed by the 3D display device according to the depth image-based rendering (DIBR) so as to produce correct naked-eye multi-view angle 3D images or glasses type dual-view angle 3D images. As shown in FIG. 4B, the packed frame can be directly displayed on the screen of the 2D display device. Herein, the center point of the color frame (the cross point of the diagonal lines of the color frame) and the center point of the screen (the cross point of the diagonal lines of the screen), which are all the center point O, are overlapped. Accordingly, the packed frame can be directly displayed on the screen of the 2D display device. As shown in FIG. 4A, the color frame (2D image) viewed by eyes is very smooth and will not make the viewer feel uncomfortable. Of course, in order to avoid the uncomfortable feeling, it is discovered that to display the center of the color frame at the central area of the screen can provide satisfied effect. In this case, the central area includes the center point and several pixels surrounding the center point. The center area can be, for example, a circular or square area. For example, FIG. 4C shows a central area of the screen as the 2D display device displays the packed frame. In FIG. 4D, the central area CA of the screen includes the center point O of the screen and the area surrounding the center point O (about ⅓ of the screen). When the center of the color frame is located within this area, the viewer will not feel uncomfortable.

To be noted, in the first embodiment, the size of the packed frame of FIG. 4A and the preset frame size of the original color frame of FIG. 3A are the same and are both 1920×1080 (1080=135+810+135). In the conventional art, the original color frame and the original depth frame are arranged by single-view angle and single depth arrangement from left to right, so that the resolution of the arranged image become twice of the original data, which can cause additional load in transmission bandwidth. According to the method and device 1 for packing the color frame and the original depth frame to obtain the packed frame of this invention, the sizes of the packed frame and the original color frame (or the original depth frame) are the same (all are 1920×1080). In addition, the method and device 1 for packing the color frame and the original depth frame to obtain the packed frame can be cooperated with any video compression method to achieve a better compression efficiency. Accordingly, the packed frame will not cause additional load for the transmission bandwidth during data transmission, and it will not cause the overloading of the 3D display device in the user end due to the exceeded decompression calculations.

Figure 5A:
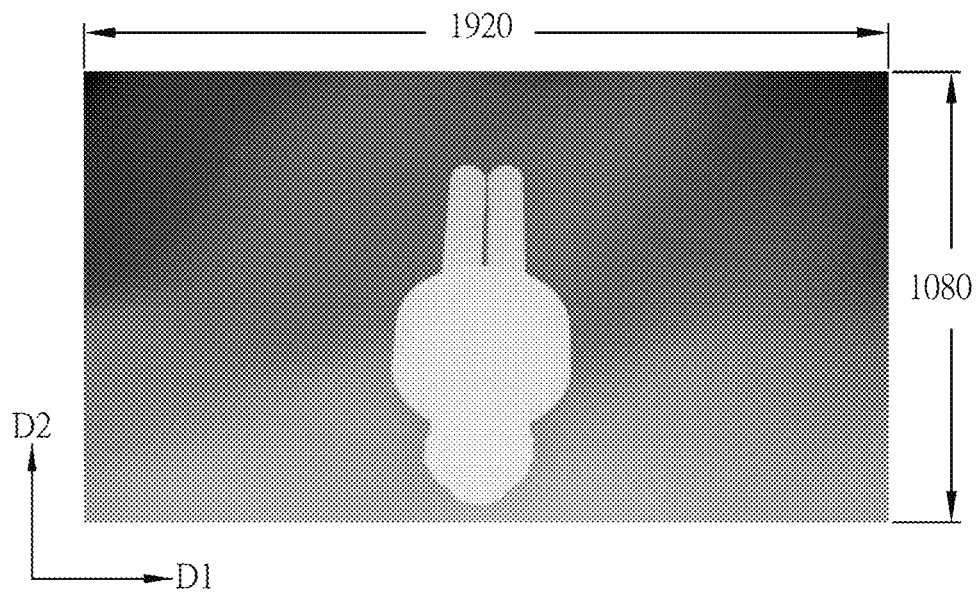
FIGS. 5A to 5D are schematic diagrams showing the procedure for processing an original depth frame of a second embodiment.
Figure 5B:
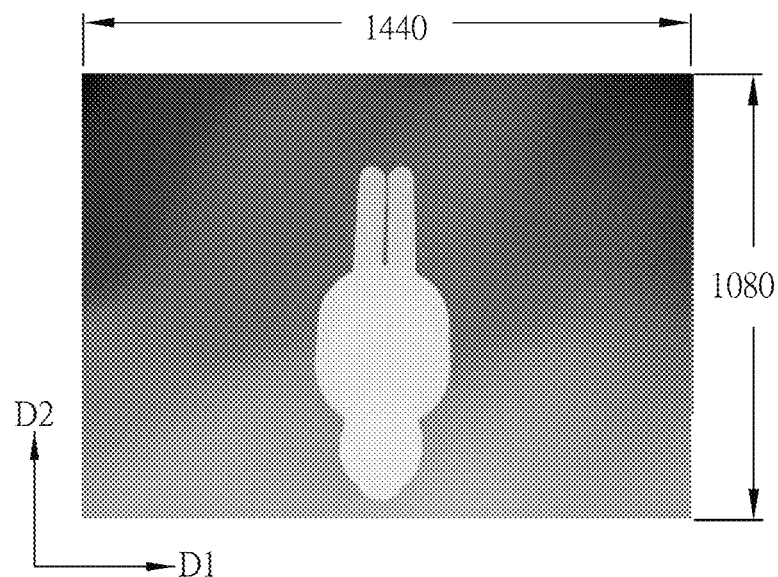
Figure 5C:
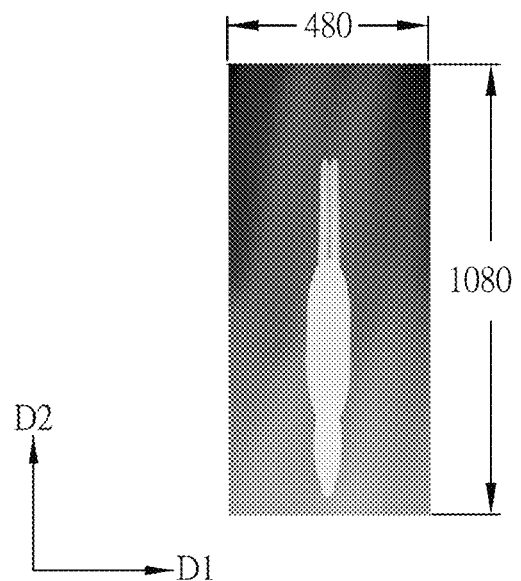
Figure 5D:
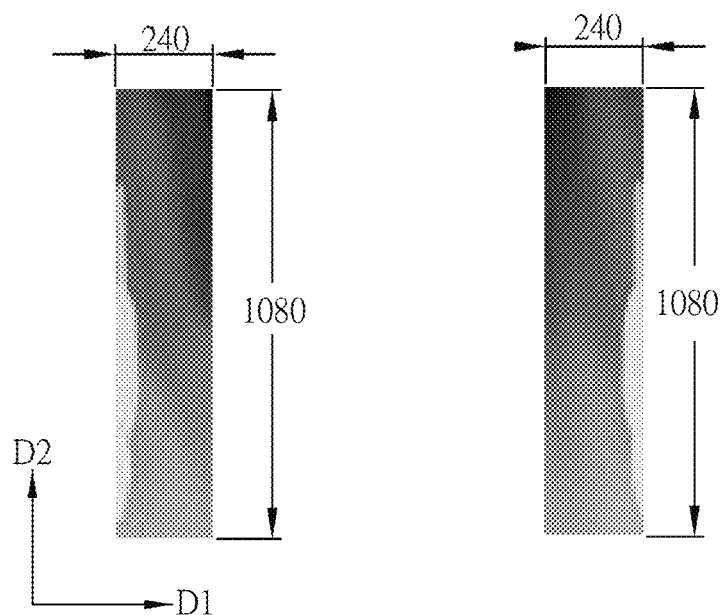
Figure 6A:
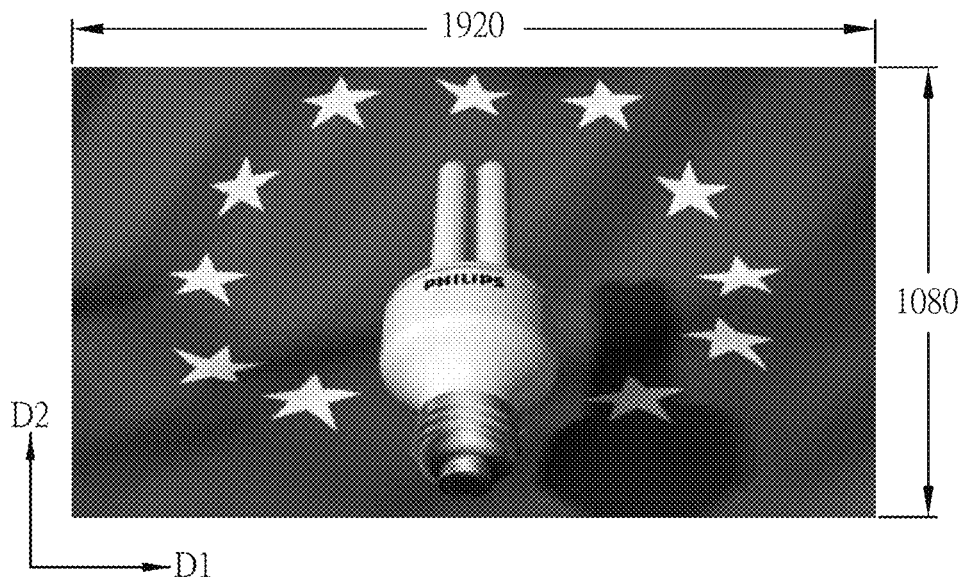
FIGS. 6A and 6B are schematic diagrams showing the procedure for processing an original color frame of the second embodiment.
Figure 6B:
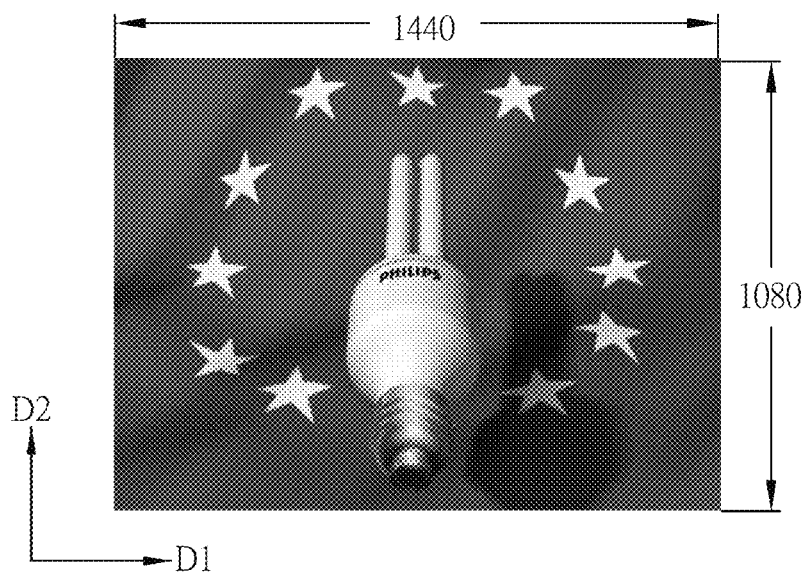

FIGS. 5A to 5D are schematic diagrams showing the procedure for processing an original depth frame of a second embodiment. FIG. 5A shows an original depth frame, FIG. 5B shows an intermediate depth frame, FIG. 5C shows a resized depth frame, and FIG. 5D shows two parts of the resized depth frame after being split and flipped. In addition, FIGS. 6A and 6B are schematic diagrams showing the procedure for processing an original color frame of the second embodiment. FIG. 6A shows an original color frame, and FIG. 6B shows a color frame produced by resizing the original color frame of FIG. 6A.

Figure 7A:
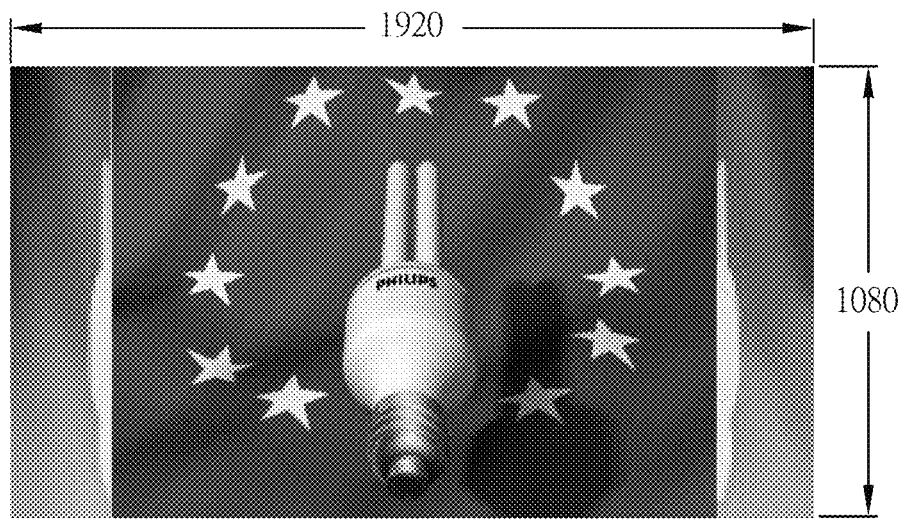
FIG. 7A is a schematic diagram showing a packed frame of the second embodiment.
Figure 7B:
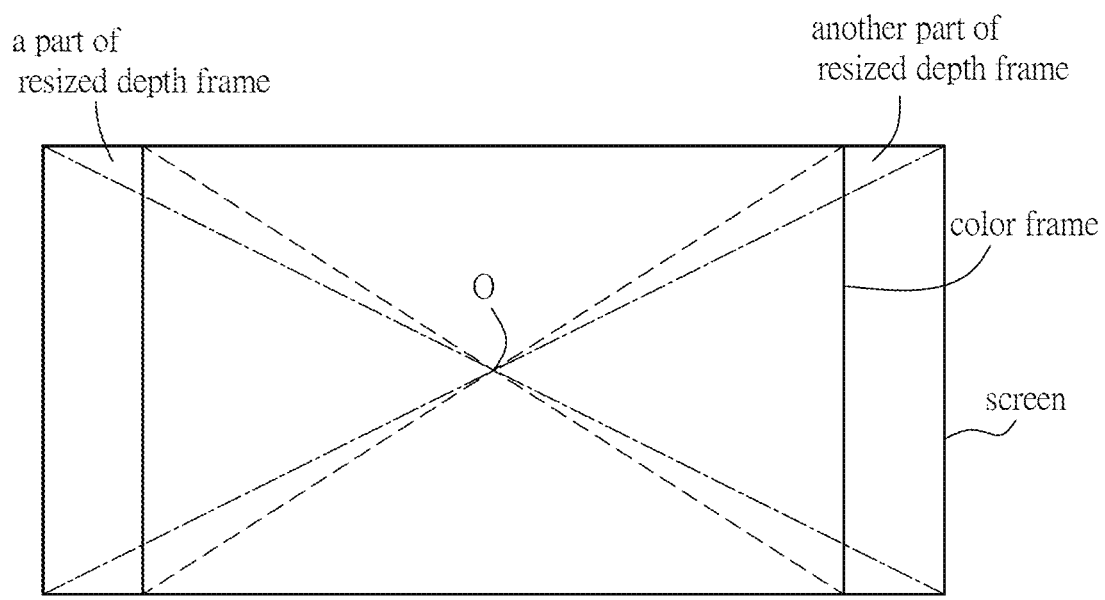
FIG. 7B is a schematic diagram showing the color frame and a screen as a 2D display device displays the packed frame of the second embodiment.

Different from the procedure of FIGS. 2A to 2D, the procedure of FIGS. 5A to 5D remains the height (1080) of the frame and resizes the frame along the row direction D1. In this case, the size (480×1080) of the resized depth frame is ¼ of the original depth frame of FIG. 5A along the row direction D1. Then, the resized depth frame is split into two parts (240×1080, FIG. 5D), which are flipped later. The combine processing unit 12 combines the two parts to the left side and right side of the downscaled color frame of FIG. 6B (1440×1080), thereby obtaining the packed frame of FIG. 7A. In addition, FIG. 7B shows the packed frame displayed in the screen.

In other embodiments, it is also possible to downscale the frame along both of the row direction D1 and the column direction D2. In addition, the depth frame and the color frame can also be downscaled to different ratios. The size of the color frame is downscaled to A times of the size of the original color frame along a direction, and the size of the intermediate depth frame is downscaled to B times of the size of the original depth frame along the same direction. Wherein, A and B fit the equality of A+B/3=1. This invention is not to limit the values of A and B. In the first embodiment, the downscaled ratio of the intermediate depth frame along the column direction D2 is the same as the downscaled ratio of the size of the color frame along the column direction D2, which means A=B=¾. In the second embodiment, the downscaled ratio of the size of the intermediate depth frame along the row direction D1 is the same as the downscaled ratio of the size of the color frame along the row direction D1, which means A=B=¾.

To be noted, the color frame can be obtained by resizing the original color frame. Otherwise, in other embodiments, it is possible to combine the color frame and the two parts of the resized depth frame so as to obtain the packed frame of different sizes. In addition, the size processing unit 11, the combine processing unit 12, the split processing unit 13 and the flip processing unit 14 can be carried out by software executed by a processor (e.g. MCU).

The above mentioned software is an example only, and the skilled person in the art can code different programs base on the above descriptions. Or, it is also possible to carry out the functions of the size processing unit 11, the combine processing unit 12, the split processing unit 13 and the flip processing unit 14 by hardware or firmware. This invention is not limited.

Figure 7C:
FIG. 7C is a schematic diagram showing an image of another packed frame obtained by the method and device for packing a color frame and an original depth frame.

FIGS. 4C and 7C are schematic diagrams showing an image of another packed frame obtained by the method and device 1 for packing a color frame and an original depth frame. The size of the frames is 1920×1080.

As shown in FIG. 4C or 7C, the person's image in the color frame viewed by eyes is very nature and will not make the viewer feel uncomfortable.

Figure 8:
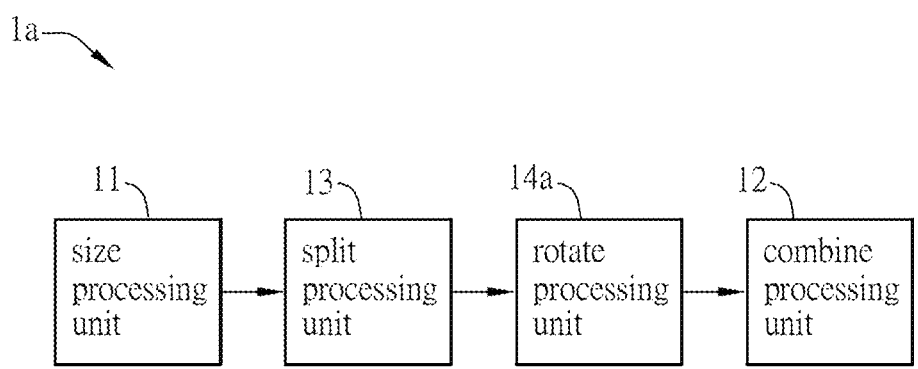
FIG. 8 is a functional block diagram of a device for packing a color frame and an original depth frame of another aspect according to a preferred embodiment of the invention.

FIG. 8 is a functional block diagram of a device 1a for packing a color frame and an original depth frame of another aspect according to a preferred embodiment of the invention.

Different from the device 1 of FIG. 1B, the device 1a includes a rotate processing unit 14a instead of the flip processing unit 14.

Figure 9A:
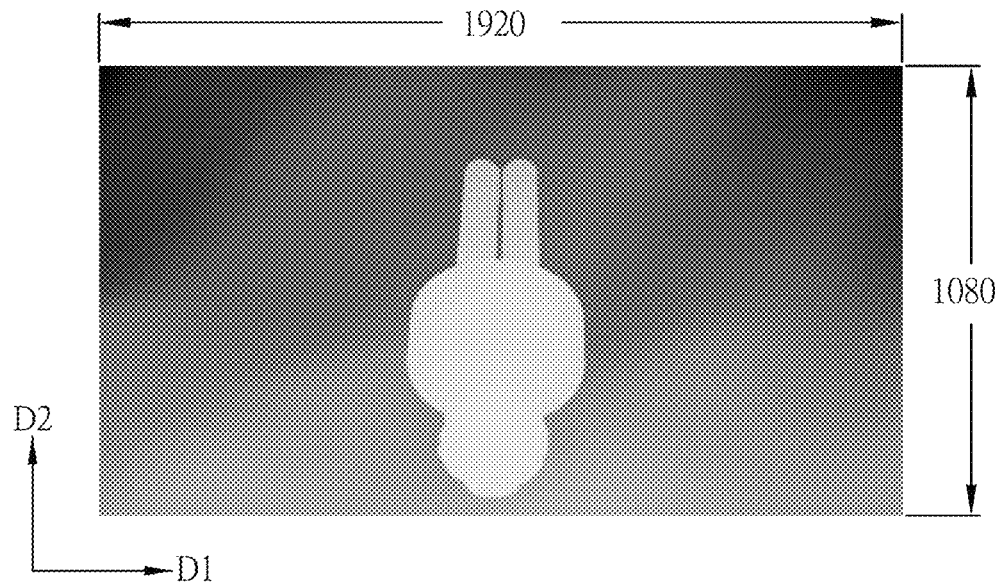
FIGS. 9A to 9D are schematic diagrams showing the procedure for processing an original depth frame of a third embodiment.
Figure 9B:
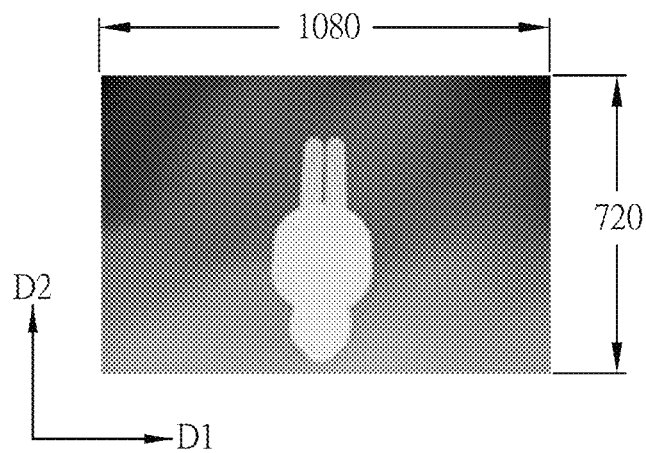
Figure 9C:
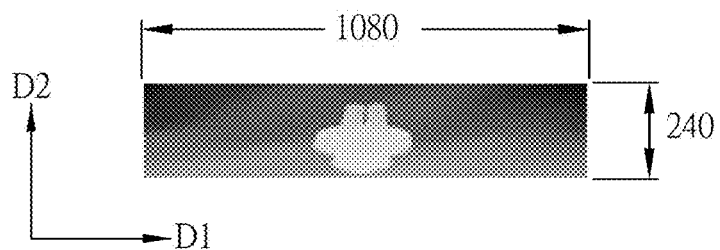
Figure 9D:
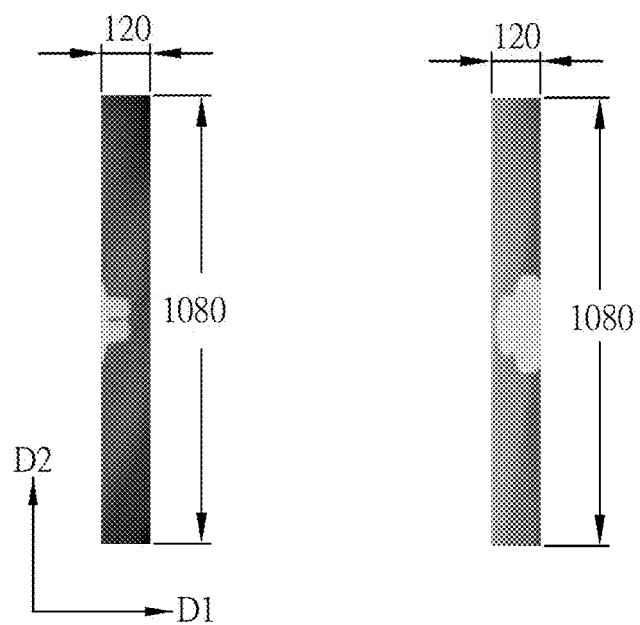
Figure 10A:
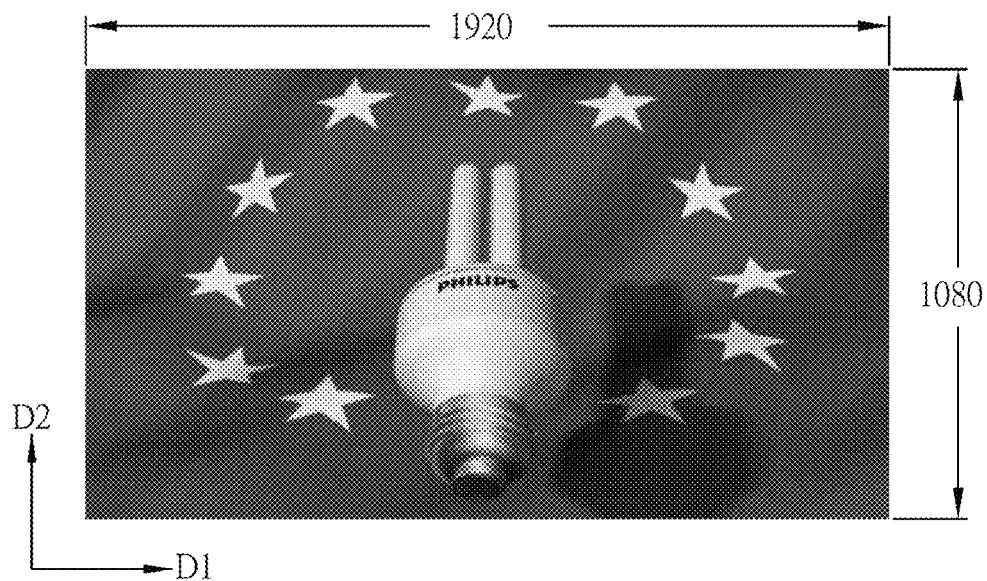
FIGS. 10A and 10B are schematic diagrams showing the procedure for processing an original color frame of the third embodiment.
Figure 10B:
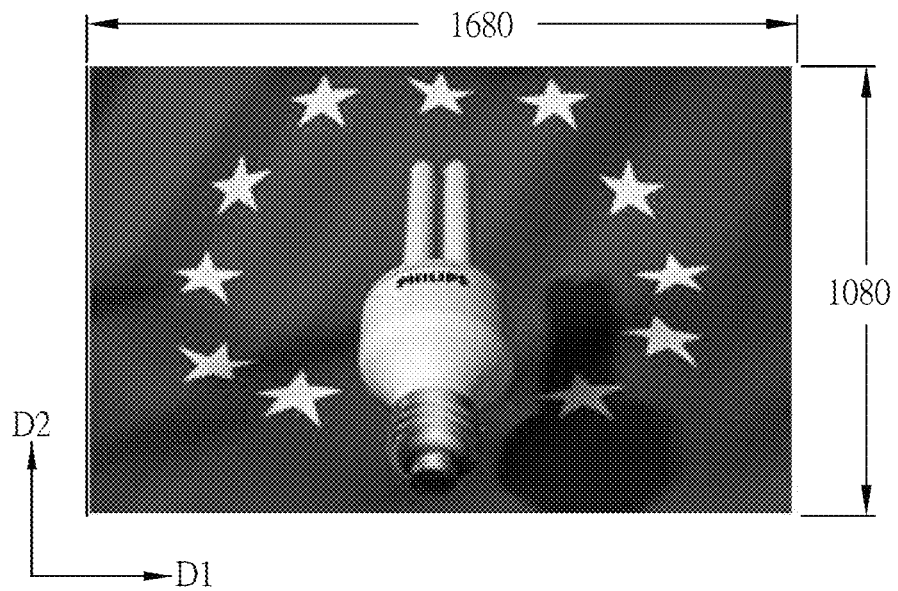

The method and device for packing a color frame and an original depth frame to obtain a packed frame according to a third embodiment will be described hereinafter with reference to FIGS. 1A and 8 in view of FIGS. 9A to 11A. FIGS. 9A to 9D are schematic diagrams showing the procedure for processing an original depth frame of a third embodiment. FIG. 9A shows an original depth frame, FIG. 9B shows an intermediate depth frame, FIG. 9C shows a resized depth frame, and FIG. 9D shows two parts of the resized depth frame after being split and flipped. FIGS. 10A and 10B are schematic diagrams showing the procedure for processing an original color frame of the third embodiment. FIG. 10A shows an original color frame, and FIG. 10B shows a color frame produced by resizing the original color frame of FIG. 10A. Third embodiment will be described with the original depth frame and the original color frame of the first embodiment, which means FIG. 9A is the same as FIG. 2A, and FIG. 10A is the same as FIG. 3A.

The step S01 is to resize the original depth frame to obtain a resized depth frame (from FIG. 9A to FIG. 9C). In step S01, the original depth frame (FIG. 9A) is resized to obtain an intermediate depth frame (FIG. 9B), and then the sub-pixels of the intermediate depth frame is rearranged to obtain the resized depth frame (FIG. 9C). The size processing unit 11 can downscale the size of the original depth frame of FIG. 9A so as to obtain the intermediate depth frame of FIG. 9B. Herein, the size of the original depth frame of FIG. 9A along the column direction D2 is downscaled to ⅔ of the original one, and the size of the original depth frame of FIG. 9A along the row direction D1 is downscaled to 9/16 of the size of the original one, thereby obtaining the intermediate depth frame of FIG. 9B. As a result, the resolution of the intermediate depth frame is 1080×720 (1080=1920×9/16, 720=1080×⅔). The sub-pixel rearrangement has been described hereinabove, so the detailed description thereof will be omitted. After the sub-pixel rearrangement, the size of the intermediate depth frame of FIG. 9B along the column direction D2 is downscaled to ⅓ of the size of the original one, so that the resolution of the resized depth frame of FIG. 9C is 1080×240 (240=720×⅓). Besides, the size of the resized depth frame of FIG. 9C along the column direction D2 is 2/9 of the original depth frame, and the size of the resized depth frame (⅓×⅓) of FIG. 9C along the row direction D1 is 9/16 of the size of the original depth frame.

In addition, the size processing unit 11 downscales the original color frame of FIG. 10A to obtain the color frame of FIG. 10B. Herein, the size of the color frame of FIG. 10B along the row direction D1 is downscaled to ⅞ of the original color frame of FIG. 10A, so that the resolution of the color frame is 1680×1080 (1680=1920×⅞).

After the color frame and the resized depth frame are obtained, the step S02 is performed to combine the color frame and the resized depth frame to obtain a packed frame. Before the step S02 of combining the color frame and the resized depth frame by the combine processing unit 12, a split processing unit 13 splits the resized depth frame of FIG. 9C into two parts (splitting along the row direction D1), and a rotate processing unit 14a rotates the two parts so as to obtain two parts of FIG. 9D (the size of each part is 120×1080). Afterwards, the combine processing unit 12 combines the two rotated parts at a left side and a right side of the color frame, respectively, to obtain the packed frame of FIG. 11A. Herein, "rotating" is to rotate clockwise by 90 degrees. Referring to the packed frame as shown in FIG. 11A, the sizes of the packed frame and the preset frame size of the original color frame are the same and are 1920×1080 (1920=120+1680+120).

Figure 11A:
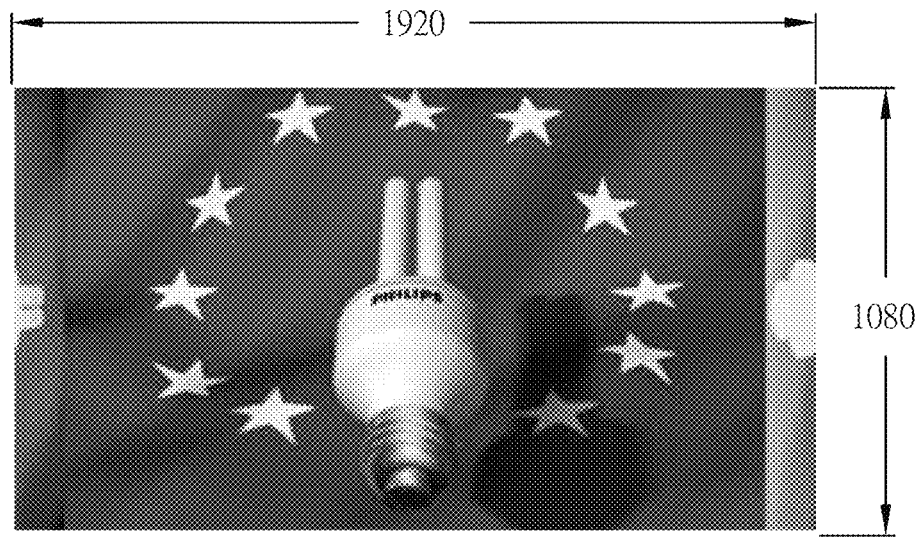
FIG. 11A is a schematic diagram showing a packed frame of the third embodiment.
Figure 11B:
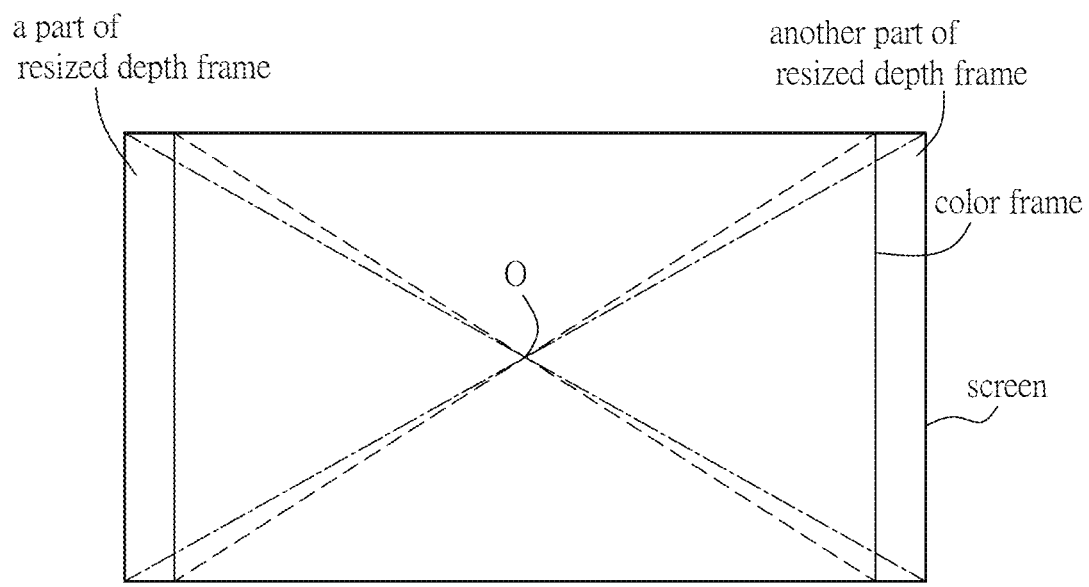
FIG. 11B is a schematic diagram showing the color frame and a screen as a 2D display device displays the packed frame of the third embodiment.

FIG. 11B is a schematic diagram showing the color frame and a screen as a 2D display device displays the packed frame of the third embodiment.

The packed frame is restored to obtain the original color frame or the original depth frame, which can be further processed by the 3D display device according to the depth image-based rendering (DIBR) so as to produce correct naked-eye multi-view angle 3D images or glasses type dual-view angle 3D images. As shown in FIG. 11B, the packed frame can be directly displayed on the screen of the 2D display device. Herein, the center point of the color frame (the cross point of the diagonal lines of the color frame) and the center point of the screen (the cross point of the diagonal lines of the screen), which are all the center point O, are overlapped. Accordingly, the packed frame can be directly displayed on the screen of the 2D display device. As shown in FIG. 11A, the color frame (2D image) viewed by eyes is very smooth and will not make the viewer feel uncomfortable. Of course, it is discovered that to display the center of the color frame at the central area of the screen can provide the same and satisfied effects, so it is unnecessary to totally overlap the center points.

To be noted, in the third embodiment, the size of the packed frame of FIG. 11A and the preset frame size of the original color frame of FIG. 10A are the same and are both 1920×1080 (1080=135+810+135). Similar to the first embodiment, the method and device 1a for packing the color frame and the original depth frame to obtain the packed frame can be cooperated with any video compression method to achieve a better compression efficiency. Accordingly, the packed frame will not cause additional load for the transmission bandwidth during data transmission, and it will not cause the overloading of the 3D display device in the user end due to the exceeded decompression calculations.

In the third embodiment, the original depth frame of FIG. 9A is resized in the row direction D1, so that the width and height thereof are the same (the width thereof is adjusted from 1920 to 1080). If the size of the original color frame is downscaled by C times along the row direction D1, the height of the original color frame is not adjusted. If the size of the original depth frame is downscaled by D times along the column direction D2, C and D must fit the equality, C+(original height/original width)×(D/3)=1. This invention is not to limit the values of C and D. In the third embodiment, C=⅞ and D=⅔.

Figure 11C:
FIG. 11C is a schematic diagram showing an image of another packed frame obtained by the method and device for packing a color frame and an original depth frame.

FIG. 11C is a schematic diagram showing an image of another packed frame obtained by the method and device 1a for packing a color frame and an original depth frame. The size of the frames is 1920×1080.

The size of FIG. 11C is still 1920×1080. As shown in FIG. 11C, the person's image in the color frame viewed by eyes is very nature and will not make the viewer feel uncomfortable.

Figure 12:
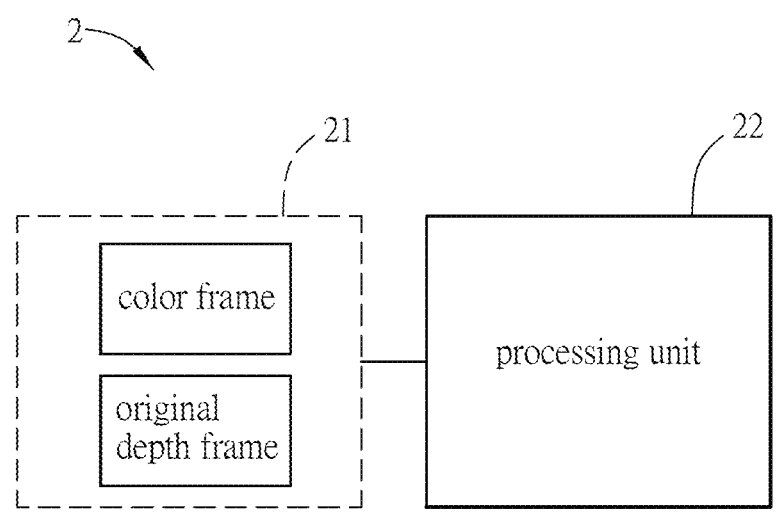
FIG. 12 is a functional block diagram of a system for packing a color frame and an original depth frame according to a preferred embodiment of the invention.

FIG. 12 is a functional block diagram of a system 2 for packing a color frame and an original depth frame of another aspect according to a preferred embodiment of the invention.

The system 2 includes a memory unit 21 and a processing unit 22, which are electrically connected to each other. The memory unit 21 stores the color frame and the original depth frame. Of course, the memory unit 21 also stores the resized depth frame and the two parts thereof, the intermediate depth frame, the packed frame or the original color frame. The memory unit 21 can be a non-transitory computer readable storage medium, such as a memory, memory card, CD, tape, or any of their combinations, for storing the needed information. In this embodiment, the memory can be a ROM, RAM, flash memory, FPGA, and any usable memory, and this invention is not limited.

The processing unit 22 includes the core control assembly of the system 2, such as a CPU and a memory including any control hardware, software or firmware. In this embodiment, the processing unit 22 resizes the original depth frame to obtain an intermediate depth frame, and then rearranges the sub-pixels of the intermediate depth frame to obtain a resized depth frame. In one embodiment, the processing unit 22 further split the resized depth frame into two parts, and combines the two parts of the resized depth frame in the top side and bottom side of the color frame so as to obtain the packed frame. Before combining the two parts of the resized depth frame in the top side and bottom side of the color frame, the processing unit 22 further flips the two parts of the resized depth frame.

In another embodiment, the processing unit 22 further split the resized depth frame into two parts, and combines the two parts of the resized depth frame in the left side and right side of the color frame so as to obtain the packed frame. Before combining the two parts of the resized depth frame in the left side and right side of the color frame, the processing unit 22 further rotates the two parts of the resized depth frame. The processing unit 22 further resizes the original color frame so as to obtain the color frame.

In addition, since the center of the color frame is displayed at the central area of the screen, and the center point of the color frame and the center point of the screen are preferably overlapped. The screen is a 2D screen. The other technical features of the original depth frame, the intermediate depth frame, the resized depth frame, the color frame, the original color frame and the packed frame have been described in the previous embodiments, so they will be omitted.

To sum up, in the method, device and system of the invention for packing a color frame and an original depth frame to obtain a packed frame, the color frame and resized depth frame are combined to obtain a packed frame with a center displayed at the central area of the screen. Afterward, the packed frame can be restored to obtain the original color frame or the original depth frame, which can be further processed by the 3D display device according to the depth image-based rendering (DIBR) so as to produce correct naked-eye multi-view angle 3D images or glasses type dual-view angle 3D images. Most important, since the center of the color frame is displayed at the central area of the screen, and the center point of the color frame and the center point of the screen are preferably overlapped and most preferably totally overlapped, the packed frame can be directly displayed on the screen of a 2D display device. Moreover, the displayed 2D images (color frames) are smoothly shown in the central area of a screen and will not make the viewer uncomfortable.

In addition, the method, device and system of the invention also resize the original depth frame to obtain the resized depth frame and combine the color frame and the resized depth frame to obtain a simplified packed frame. Accordingly, the technology of the invention can be cooperated with other video compression system to enhance the compression ratio, thereby decreasing the bandwidth requirement for 3D video. This feature is further benefit to the promotion of 3D channels.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for packing a color frame and an original depth frame to obtain a packed frame, wherein the color frame is corresponding to the original depth frame, and the packed frame is to be displayed on a screen, the method comprising steps of:
resizing the original depth frame to obtain an intermediate depth frame;
rearranging sub-pixels of the intermediate depth frame to obtain a resized depth frame; and
combining the color frame and the resized depth frame to obtain the packed frame, wherein a center of the color frame is displayed in a central area of the screen.

2. The method of claim 1, wherein a center point of the color frame is overlapped with a center point of the screen.

3. The method of claim 1, wherein the size of the resized depth frame is ⅓ of the size of the intermediate depth frame along a column direction.

4. The method of claim 1, wherein the resized depth frame has a plurality of pixels, each of the pixels has three sub-pixels, and the sub-pixels correspond to sub-pixel values of three pixels of the intermediate depth frame.

5. The method of claim 1, wherein the step of combining the color frame and the resized depth frame comprises:
dividing the resized depth frame into two parts; and
combining the two parts at a top side and a bottom side of the color frame, respectively.

6. The method of claim 5, wherein the step of combining the two parts at the top side and the bottom side of the color frame, respectively, comprises:
flipping the two parts with respect to the resized depth frame.

7. The method of claim 1, wherein the step of combining the color frame and the resized depth frame comprises:
dividing the resized depth frame into two parts; and
combining the two parts at a left side and a right side of the color frame, respectively.

8. The method of claim 7, wherein the step of combining the two parts at the left side and the right side of the color frame, respectively, comprises:
flipping the two parts with respect to the resized depth frame.

9. The method of claim 1, further comprising:
resizing an original color frame to obtain the color frame.

10. The method of claim 9, wherein the original color frame has a preset frame size, and the size of the packed frame is the same as the preset frame size.

11. The method of claim 9, wherein the size of the color frame is downscaled to A times of the size of the original color frame along a direction, and the size of the intermediate depth frame is downscaled to B times of the size of the original depth frame along the same direction.

12. The method of claim 11, wherein A and B fit the equation of $A+B/3=1$.

13. The method of claim 11, wherein A and B are ¾, respectively.

14. A device for packing a color frame and an original depth frame to obtain a packed frame, wherein the color frame is corresponding to the original depth frame, and the packed frame is to be displayed on a screen, the device comprising:
a size processing unit for resizing the original depth frame to obtain a resized depth frame, wherein the size processing resizes the original depth frame to obtain an intermediate depth frame, and rearranges sub-pixels of the intermediate depth frame to obtain the resized depth frame; and a combine processing unit for combining the color frame and the resized depth frame to obtain the packed frame, wherein a center of the color frame is displayed in a central area of the screen.

15. The device of claim 14, wherein a center point of the color frame is overlapped with a center point of the screen.

16. The device of claim 14, wherein the size of the resized depth frame is ⅓ of the size of the intermediate depth frame along a column direction.

17. The device of claim 14, wherein the resized depth frame has a plurality of pixels, each of the pixels has three sub-pixels, and the sub-pixels correspond to sub-pixel values of three pixels of the intermediate depth frame.

18. The device of claim 14, further comprising:
a split processing unit for dividing the resized depth frame into two parts, wherein the combine processing unit further combines the two parts at a top side and a bottom side of the color frame, respectively, to obtain the packed frame.

19. The device of claim 18, further comprising:
a flip processing unit for flipping the two parts of the resized depth frame before combining the two parts at the top side and the bottom side of the color frame, respectively.

20. The device of claim 14, further comprising:
a split processing unit for dividing the resized depth frame into two parts, wherein the combine processing unit further combines the two parts at a left side and a right side of the color frame, respectively, to obtain the packed frame.

21. The device of claim 20, further comprising:
a flip processing unit for flipping the two parts of the resized depth frame before combining the two parts at the left side and the right side of the color frame, respectively.

22. The device of claim 14, wherein the size processing unit further resizes an original color frame to obtain the color frame.

23. The device of claim 22, wherein the original color frame has a preset frame size, and the size of the packed frame is the same as the preset frame size.

24. The device of claim 22, wherein the size of the color frame is downscaled to A times of the size of the original color frame along a direction, and the size of the intermediate depth frame is downscaled to B times of the size of the original depth frame along the direction.

25. The device of claim 24, wherein A and B fit the equation of $A+B/3=1$.

26. The device of claim 24, wherein A and B are ¾, respectively.

27. A system for packing a color frame and an original depth frame to obtain a packed frame, wherein the color frame is corresponding to the original depth frame, and the packed frame is to be displayed on a screen, the system comprising:
a memory for storing the color frame and the original depth frame; and
a processor for resizing the original depth frame to obtain a resized depth frame, and combining the color frame and the resized depth frame to obtain the packed frame, wherein a center of the color frame is displayed in a central area of the screen, wherein the processor resizes the original depth frame to obtain an intermediate depth frame, and rearranges sub-pixels of the intermediate depth frame to obtain the resized depth frame.

28. The system of claim 27, wherein a center point of the color frame is overlapped with a center point of the screen.

29. The system of claim 27, wherein the size of the resized depth frame is ⅓ of the size of the intermediate depth frame along a column direction.

30. The system of claim 27, wherein the resized depth frame has a plurality of pixels, each of the pixels has three sub-pixels, and the sub-pixels correspond to sub-pixel values of three pixels of the intermediate depth frame.

31. The system of claim 27, wherein the processor further splits the resized depth frame into two parts, and combines the two parts at a top side and a bottom side of the color frame, respectively, to obtain the packed frame.

32. The system of claim 31, wherein the processor further flips the two parts of the resized depth frame before combining the two parts at the top side and the bottom side of the color frame, respectively.

33. The system of claim 27, wherein the processor further splits the resized depth frame into two parts, and combines the two parts at a left side and a right side of the color frame, respectively, to obtain the packed frame.

34. The system of claim 33, wherein the processor further flips the two parts of the resized depth frame before combining the two parts at the left side and the right side of the color frame, respectively.

35. The system of claim 27, wherein the processor further resizes an original color frame to obtain the color frame.

36. The system of claim 35, wherein the original color frame has a preset frame size, and the size of the packed frame is the same as the preset frame size.

37. The system of claim 35, wherein the size of the color frame is downscaled to A times of the size of the original color frame along a direction, and the size of the intermediate depth frame is downscaled to B times of the size of the original depth frame along the direction.

38. The system of claim 37, wherein A and B fit the equation of $A+B/3=1$.

39. The system of claim 37, wherein A and B are ¾, respectively.

* * * * *